(12) United States Patent
Sundaresan et al.

(10) Patent No.: US 10,469,188 B2
(45) Date of Patent: Nov. 5, 2019

(54) SYSTEM AND METHOD FOR ENABLING INTERFERENCE-AWARENESS FOR LTE OPERATION IN UNLICENSED SPECTRUM

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Ramanujan Sheshadri, Lawrence Township, NJ (US); Mohammad Khojastepour, Lawrenceville, NJ (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/039,733

(22) Filed: Jul. 19, 2018

(65) Prior Publication Data

US 2019/0036629 A1 Jan. 31, 2019

Related U.S. Application Data

(60) Provisional application No. 62/538,778, filed on Jul. 30, 2017.

(51) Int. Cl.
*H04L 12/26* (2006.01)
*H04B 17/345* (2015.01)
*H04W 24/10* (2009.01)
*H04W 72/08* (2009.01)
*H04J 11/00* (2006.01)
*H04W 74/08* (2009.01)
*H04W 16/14* (2009.01)

(Continued)

(52) U.S. Cl.
CPC ........ *H04B 17/345* (2015.01); *H04J 11/0026* (2013.01); *H04W 24/10* (2013.01); *H04W 72/082* (2013.01); *H04W 74/0816* (2013.01); *H04J 2211/005* (2013.01); *H04W 16/14* (2013.01); *H04W 72/1226* (2013.01); *H04W 84/045* (2013.01)

(58) Field of Classification Search
CPC .. H04B 17/345; H04J 11/0026; H04W 24/10; H04W 72/082; H04W 74/0816
USPC ................ 370/252, 329–330, 338, 341–345, 370/348–349; 455/63.1–65, 500–501, 455/114.2–114.3
See application file for complete search history.

(56) References Cited

U.S. PATENT DOCUMENTS 9,332,465 B2   5/2016   Valliappan et al.
9,806,836 B2   10/2017  Sadek et al.
(Continued)

*Primary Examiner* — Thai D Hoang
(74) *Attorney, Agent, or Firm* — Joseph Kolodka

(57) ABSTRACT

A computer-implemented method executed on a processor for employing an epoch-based approach to estimating interference in an unlicensed spectrum is presented. The method includes enabling communication between a long-term evolution (LTE) evolved node B (eNodeB) and a plurality of clients, detecting and measuring the interference in all existing non-overlapping channels, via the LTE eNodeB, caused by one or more hidden clients of the plurality of clients, collecting interference statistics from all of the plurality of clients across all different channels, and leveraging interference-awareness resulting in channel access performance improvement at a macro-time scale and a micro-time scale.

20 Claims, 9 Drawing Sheets

(51) Int. Cl.
*H04W 84/04* (2009.01)
*H04W 72/12* (2009.01)

(56) References Cited

U.S. PATENT DOCUMENTS

| | | | |
|---|---|---|---|
| 2007/0147322 A1* | 6/2007 | Agrawal | H04W 52/325 370/338 |
| 2014/0169279 A1* | 6/2014 | Song | H04W 72/082 370/329 |
| 2015/0126207 A1 | 5/2015 | Li et al. | |
| 2015/0133057 A1* | 5/2015 | Yavuz | H04W 72/02 455/63.3 |
| 2015/0133184 A1* | 5/2015 | Sadek | H04W 16/14 455/552.1 |
| 2015/0173056 A1* | 6/2015 | Yerramalli | H04W 16/14 370/329 |
| 2016/0128080 A1 | 5/2016 | Verma et al. | |
| 2016/0135148 A1 | 5/2016 | Novlan et al. | |
| 2016/0174095 A1* | 6/2016 | Damnjanovic | H04W 36/24 370/252 |
| 2017/0071011 A1 | 3/2017 | Jin et al. | |
| 2017/0195081 A1 | 7/2017 | Yerramalli et al. | |
| 2017/0280480 A1* | 9/2017 | Wong | H04W 74/0808 |
| 2018/0035462 A1* | 2/2018 | Mallik | H04W 48/08 |
| 2018/0091979 A1* | 3/2018 | Yang | H04W 72/04 |
| 2018/0234871 A1* | 8/2018 | Ahn | H04L 5/0048 |
| 2018/0241487 A1* | 8/2018 | Li | H04W 16/14 |
| 2018/0376339 A1* | 12/2018 | Hu | H04W 16/14 |
| 2018/0376434 A1* | 12/2018 | Cui | H04W 72/1289 |
| 2019/0036786 A1* | 1/2019 | Khojastepour | H04L 41/12 |

\* cited by examiner

SYSTEM AND METHOD FOR ENABLING INTERFERENCE-AWARENESS FOR LTE OPERATION IN UNLICENSED SPECTRUM

RELATED APPLICATION INFORMATION

This application claims priority to Provisional Application No. 62/538,778, filed on Jul. 30, 2017, incorporated herein by reference in its entirety.

BACKGROUND

Technical Field

The present invention relates to long-term evolution (LTE) communications and, more particularly, to methods and systems for enabling interference-awareness for LTE operation in the unlicensed spectrum.

Description of the Related Art

To address the increasing demand for additional long-term evolution (LTE) spectrum, there is growing interest and support to operate LTE in the unlicensed band in conjunction with operations in the licensed spectrum. Accordingly, an LTE node operating in the unlicensed spectrum is needed to implement an asynchronous channel access mechanism that includes both energy sensing and back-off to ensure fair co-existence with the incumbent WiFi. Traditional network providers have started rolling out licensed assisted access (LAA) technology. In addition, there is also an effort by green-field providers to develop a standalone LTE specification that can operate LTE entirely in the unlicensed band without any assistance from the licensed spectrum for use in private LTE networks.

SUMMARY

A computer-implemented method executed on a processor for employing an epoch-based approach to estimating and mitigating the effect of interference on the LTE (-LAA)'s performance, in an unlicensed spectrum is presented. The method includes enabling communication between a long-term evolution (LTE) evolved node B (eNodeB) and a plurality of clients, detecting and measuring the interference in all existing non-overlapping channels, via the LTE eNodeB, caused by one or more hidden clients of the plurality of clients, collecting interference statistics from all of the plurality of clients across all different channels, and leveraging interference-awareness resulting in channel access performance improvement at a macro-time scale and a micro-time scale.

A system for employing an epoch-based approach to estimating and mitigating the effect of interference on the LTE (-LAA)'s performance, in an unlicensed spectrum is also presented. The system includes a memory and a processor in communication with the memory, wherein the processor is configured to enable communication between a long-term evolution (LTE) evolved node B (eNodeB) and a plurality of clients, detect and measure the interference in all existing non-overlapping channels, via the LTE eNodeB, caused by one or more hidden clients of the plurality of clients, collect interference statistics from all of the plurality of clients across all different channels, and leverage interference-awareness resulting in channel access performance improvement at a macro-time scale and a micro-time scale.

A non-transitory computer-readable storage medium comprising a computer-readable program is presented for employing an epoch-based approach to estimating interference in an unlicensed spectrum, wherein the computer-readable program when executed on a computer causes the computer to perform the steps of enabling communication between a long-term evolution (LTE) evolved node B (eNodeB) and a plurality of clients, detecting and measuring the interference in all existing non-overlapping channels, via the LTE eNodeB, caused by one or more hidden clients of the plurality of clients, collecting interference statistics from all of the plurality of clients across all different channels, and leveraging interference-awareness resulting in channel access performance improvement at a macro-time scale and a micro-time scale.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As is the case with any access technology, to operate efficiently in the unlicensed spectrum, long-term evolution (LTE) needs to intelligently pick a channel and then operate efficiently within the selected channel. While this issue is similar to that in WiFi, LTE's inherent transmission characteristics, makes designing a LTE-specific solution challenging.

Figure 1:
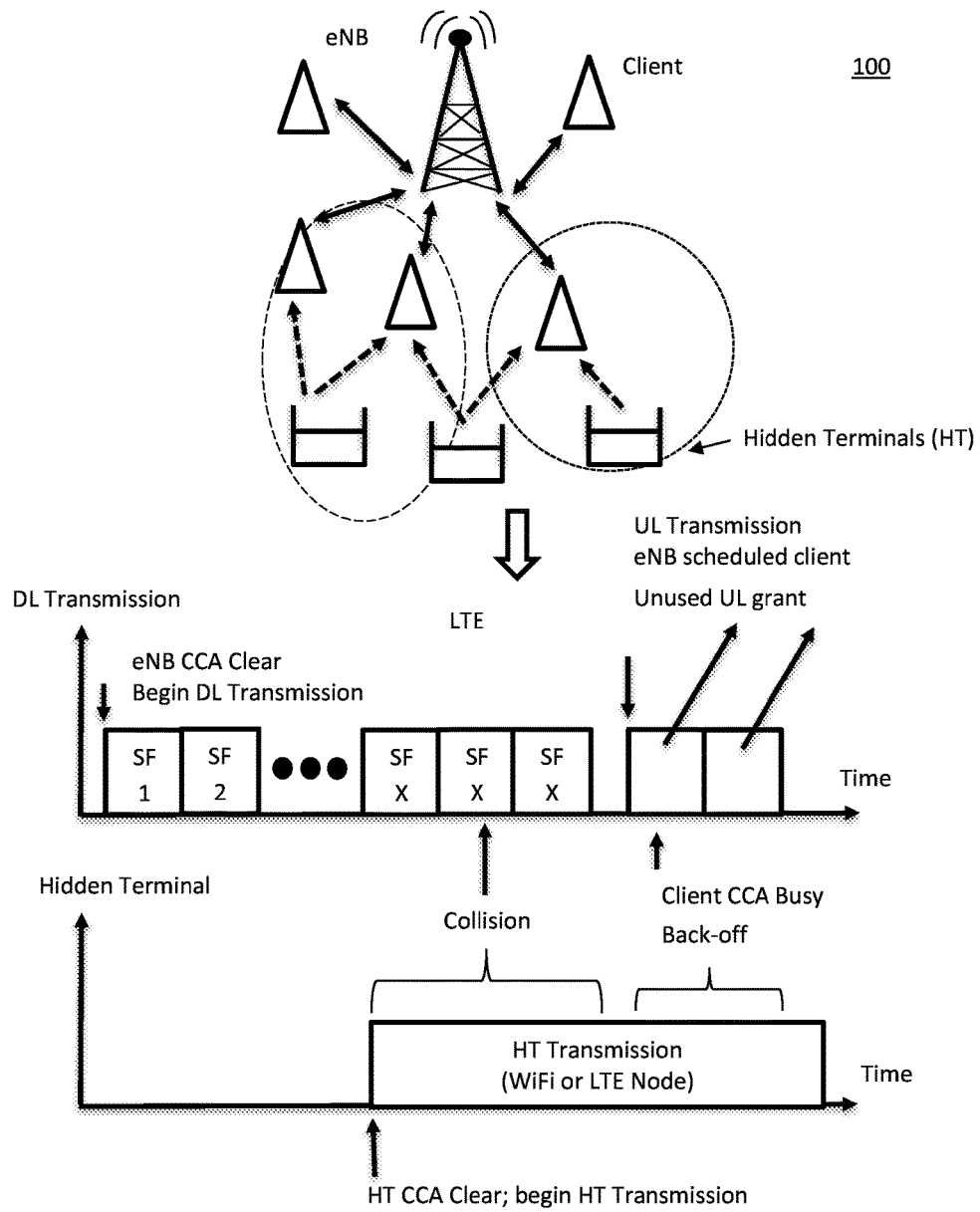
FIG. 1 is a block/flow diagram illustrating evolved node B (eNB) subframes colliding on the downlink (DL), in accordance with embodiments of the present invention.

WiFi employs an asynchronous and distributed access mechanism, where every node is individually responsible to scan the channel in its vicinity and make independent access decisions based on perceived interference. In contrast, while both evolved node B (eNB or eNodeB) and clients perform listen before talk (LBT), LTE mandates the eNB to schedule channel access to each of its clients (UEs) both on the downlink (DL) and uplink (UL) (FIG. 1; 100). Such an eNB-controlled approach delivers optimal performance gains for LTE in the licensed spectrum that is free of external interference. However, in unlicensed spectrum, this leads to lack of visibility into channel (interference) state at the clients, resulting in collisions on the DL, and spectrum under-utilization on the UL (FIG. 1; 100). This coupled with LTE's longer transmission durations of 2-10 ms, along with its lack of interference avoidance mechanisms can degrade its performance when the interfering nodes are hidden from the eNB.

While introducing interference avoidance techniques (similar to WiFi's request to send/clear to send (RTS/CTS)) and reducing transmission durations can alleviate the impact of such interference, this would make changes to the LTE specification a major road-block to practical realization. In contrast, the exemplary methods focus on the root-cause for this magnified impact of interference, namely LTE's eNB-driven channel access procedure, which lacks information on the interference perceived by its clients. Consequently, any solution to tackle this issue should start by equipping the eNB with the ability to detect and estimate interference at the clients. However, there are challenges in bringing interference awareness into LTE.

In one instance, accurate estimation of interference can be an issue. A natural approach to detect hidden terminal interference at the clients would be to measure the failure of eNB's DownLink (DL) transmissions by using the hybrid automatic repeat request (HARD) feedback (ACK/NACK) sent by the clients. However, transmission failures can result from collisions (due to hidden terminals), or due to the vagaries of the channel itself (e.g., channel fading). The inability of HARQ to clearly distinguish the reason for failure makes them less useful for estimating interference. Hence, an alternate mechanism is needed to accurately estimate interference that is specific to individual clients.

In another instance, scalable estimation of interference can be an issue. Unlike the licensed spectrum, interference in the unlicensed spectrum could vary significantly across different channels, and across clients (both spatially and temporally).

Consequently, for an LTE eNB to make effective channel access decisions, the LTE eNB needs to estimate interference at all clients on each of the candidate channels that the eNB considers for regular operation. This constitutes an overhead that scales both with the number of clients and channels and can quickly become prohibitive. For example, a dense LTE network, potentially hosting hundreds of clients, in 5 GHz and/or CBRS (3.5 GHz) bands that contain multiple channels, could incur substantial overhead that negates the performance gains resulting from such interference awareness. Hence, while it is necessary to estimate such interference information, it needs to be done in a highly scalable manner.

In another instance, leveraging interference-awareness can be an issue. To orchestrate LTE for efficient access in unlicensed spectrum, it is important to understand how a user can leverage the estimated interference information in LTE's channel access mechanisms in a standards-compliant manner.

The exemplary embodiments of the present invention propose the ELI method to address these challenges and make LTE robust in the presence of interference in the unlicensed spectrum. ELI employs a three-pronged approach, which includes (a) equipping eNB to accurately detect and measure interference caused by hidden terminals; (b) collecting interference statistics across channels for all the clients in a scalable manner; and (c) using collected interference statistics through novel standards compliant access techniques to deliver improved performance.

While the eNB cannot differentiate between a fading and a (interference) collision loss on the DL through HARQ, ELI leverages their varied manifestation on the UL, where clients employ LBT for access. When hidden terminals are detected by clients during their LBT, they refrain (backoff) from transmitting (both their reference-signals/pilots and data) on their scheduled UL resources. This manifestation is different from a fading scenario, where both pilots and data are transmitted—the data gets corrupted, while pilots can still be recovered due to their use of the most robust rate (MCS). Thus, by scheduling a client on UL resources and observing its UL pilots, ELI is able to accurately estimate the interference statistics (probability of hidden terminal interference) at the client.

ELI employs a two-step solution to minimize the overhead associated with estimating interference. First, ELI reduces the number of channels that need to be measured by half, while still obtaining the desired interference information on all channels. ELI does this by intelligently leveraging LTE's orthogonal frequency-division multiple access (OFDMA) capability to concurrently transmit on fine-grained spectral resources (LTE resource blocks) within a channel, to measure interference on two channels simultaneously or concurrently, while incurring the measurement overhead of a single channel. Second, ELI samples only a fraction of clients for whom interference needs to be estimated on each channel, while still obtaining the desired information for all the clients. Here, ELI leverages the diversity of interference (hidden terminals) across channels to spatially cluster clients with the same interference statistics.

Finally, ELI leverages the collected interference statistics of all the clients on all channels, to (i) dynamically select an unlicensed channel (at coarse time scales, secs-min) that has minimal impact from hidden terminals on its clients, and (ii) within the chosen channel, transforms the proportionally fair (PF) scheduler at eNB into an interference-aware PF scheduler that accounts for the true channel state of the clients at fine time scales (milli-secs) in its channel access (scheduling) allocations.

Therefore, through the design of ELI, some or all of the following can be provided:

Motivate the need for interference-awareness when operating LTE in unlicensed spectrum.

Introduce accurate, scalable, and standards-compliant approach to estimate interference at the clients due to hidden terminals.

Incorporate interference awareness into LTE to improve access performance at both macro (channel selection) and micro (scheduling) time scales.

Provide detailed evaluations to show that ELI can deliver throughput gains of ≈1.5× to 2× when compared to existing schemes, etc.

LTE is essentially designed to operate in a licensed band, with a synchronous and a scheduled access mechanism, where the eNB schedules clients for both UL and DL traffic. LTE transmissions happen in the granularity of sub-frames, each being 1 ms, and includes two slots (0.5 ms each). Each slot spans both time-frequency resources by including multiple OFDM symbols and sub-carriers. In a time-divisioned duplex (TDD) system, DL subframes (eNB transmissions) are followed by (optional) special sub-frames followed by UL sub-frames, where clients transmit in the UL resources allocated to them a priori (based on clients'schedule requests) by the eNB. A special sub-frame is a transition sub-frame including part DL and part UL transmissions along with a guard period. The LTE schedulers allocate blocks of subcarriers to each client, known as resource blocks, which are then used to exchange data with the clients on both DL and UL. The total number of resource blocks available for the eNB depends on the channel width (e.g., 100 RBs in 20 MHz channel bandwidth). Each resource block is orthogonal to each other which enables the eNB to allocate each resource block to a different client. This allows for simultaneous data and control information to be exchanged between the eNB and its clients on the allocated resource blocks using OFDMA principles.

Concerning Listen Before Talk (LBT) in LTE, the third generation partnership project (3GPP) release needs LTE nodes operating in the unlicensed spectrum to implement the LTE-LBT procedure which includes both clear channel assessment (CCA) energy detection, and back-off. If the channel is busy (e.g., detected energy is above the prescribed CCA threshold), the eNB implements exponential back-off and waits for the back-off counter to expire before attempting to transmit again on DL. On the other hand, when it is time for the client (UE) to transmit on its scheduled UL resources, due to its LBT procedure it backs-off and simply forgoes its transmission opportunity if the channel is busy and waits for the eNB to schedule its next transmission. Time division duplex (TDD), is the dominant flavor covering both license-assisted and stand-alone LTE modes in unlicensed spectrum.

Figure 2:
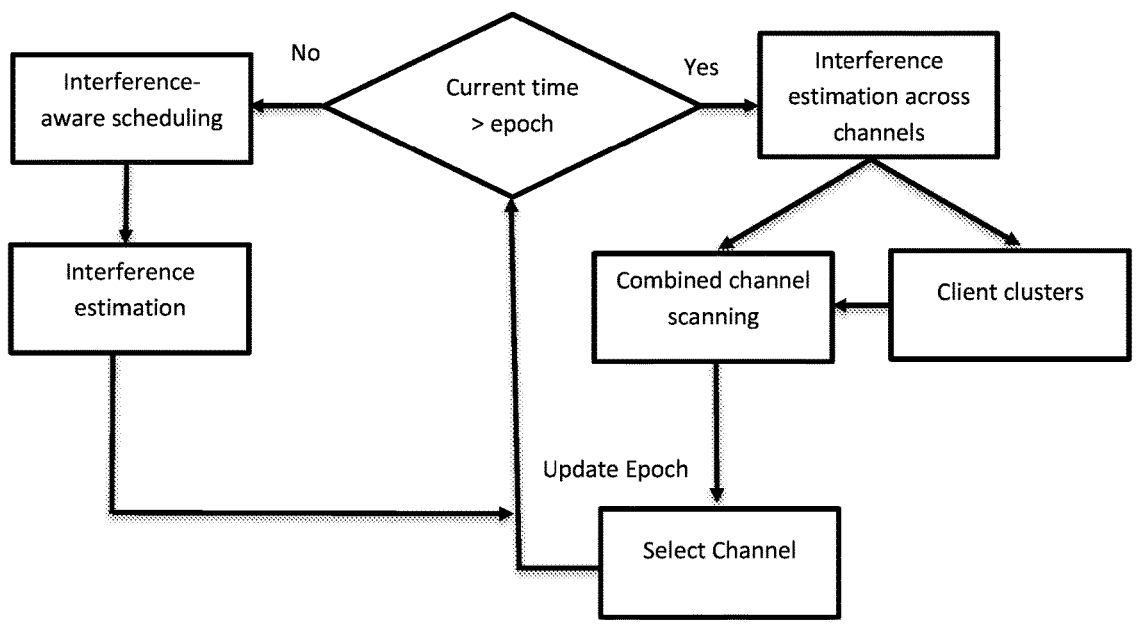
FIG. 2 is a block/flow diagram illustrating design control flow, in accordance with embodiments of the present invention.

ELI targets a TDD system, where both DL and UL operate sequentially on the same unlicensed channel chosen by the eNB. TDD systems are more generic in scope as TDD systems encompass not only LTE-LAA systems but also stand-alone LTE systems, which are primarily TDD in operation. ELI operates channel access in epochs as shown in FIG. 2 (200). With LTE being more vulnerable to interference than WiFi, ELI chooses a shorter epoch duration of 1 minute for channel access decisions, to track and adapt to interference at finer time scales.

Each epoch includes two phases, that is, (i) channel selection, where the epoch starts with the estimation of hidden terminal interference at each client on every candidate unlicensed channel and selects the most appropriate channel with the least impact of interference on its clients' rates, then schedules its clients in that channel for actual operation for the rest of the epoch. (ii) interference-aware channel access, where ELI uses the estimated interference information to allocate resources and schedule transmission to its clients (interference-aware LTE scheduler). Note that during the channel-selection phase, while data is also transferred (clients are scheduled), the channel access is not optimized for efficiency but more for measurement and hence constitutes an overhead. Thus, in addition to the actual interference-aware channel access, reducing the time incurred in the estimation phase is necessary and incorporated into ELI's design.

Figure 3:
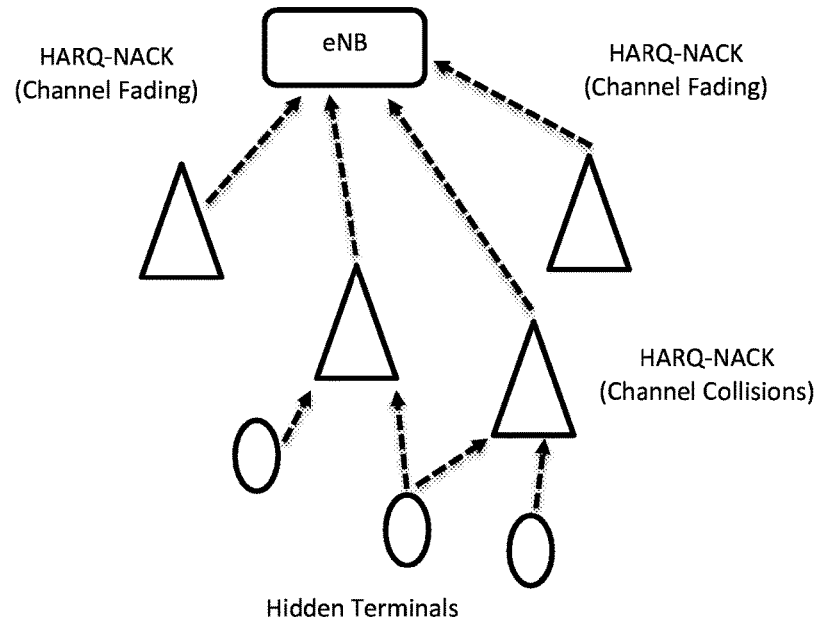
FIG. 3 is a block/flow diagram illustrating inability to distinguish fading from collisions using only hybrid automatic repeat request (HARQ) feedbacks (top) and ability to distinguish between fading and collisions using uplink (UL) reference signals (bottom), in accordance with embodiments of the present invention.
Figure 3:
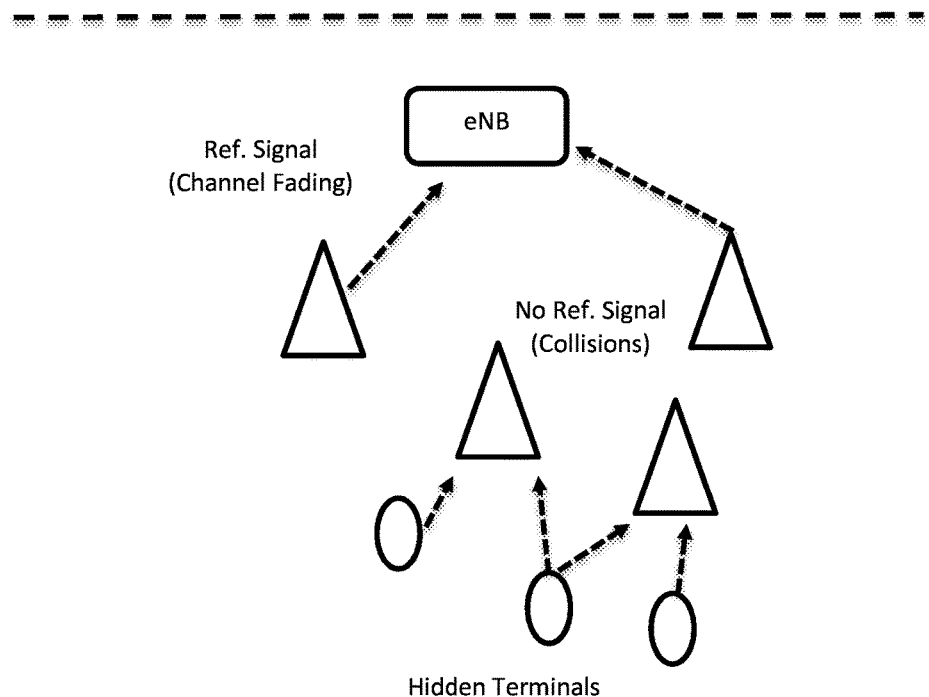

Regarding accurate estimation of hidden terminal interference, while eNB is able to directly estimate the interference perceived by it, eNB does not have information on interference faced by clients, but hidden from itself. A natural approach to measure such hidden terminal interference is for eNB to use the client's feedback packets like HARQ to verify if DL transmissions incurred any collisions due to hidden terminal traffic. While the HARQ feedbacks clearly indicate the failure of DL transmissions (through NACKs), they do not reveal the cause, which could be due to collisions or simply due to decreased path loss from channel fading (FIG. 3; 300). Thus, eNB is unable to isolate the impact of hidden terminal interference from channel fading. While channel fading plagues all clients and is fleeting in nature, hidden terminal interference is persistent, and varies significantly from one client to another as well as across channels. Hence, ELI needs to isolate and estimate this interference to counteract it.

Concerning leverage interference manifestation on UL during LBT, ELI leverages the combination of LTE's scheduled access along with clients' LBT mechanism on the UL to isolate and detect hidden terminal interference. An LTE client performs LBT before UL channel access, where the LTE client senses the channel for active transmissions if the LTE client detects energy above a specified (CCA) threshold, it backs-off from its transmission (LBT). Further, unlike WiFi, where every client scans the channel independently before accessing the channel, the LTE eNB schedules the clients for their UL channel access. Hence, the eNB is aware of when and where a scheduled client will transmit on in the UL. Thus, when the eNB is able to transmit on the DL (employing LBT), but does not receive any signal (including the reference signal, e.g., pilot tones) from the client on its scheduled UL resources, the eNB can be certain that the client has backed-off from its transmission due to hidden terminal interference (client's LBT).

Since the reference signals are sent at the lowest modulation, they are more resistant to the vagaries of the channel (e.g., path loss due to fading) compared to data. This helps the eNB distinguish between a fading scenario (data corrupted but pilots received) from a hidden terminal (no data and pilots received) one reliably on the UL. Over time, the eNB uses this information to estimate the probability of a hidden terminal blocking the client from transmitting ($Q_i$), and thus the access probability of a client subject to hidden terminal interference ($P_i=1-Q_i$).

The eNB does not necessarily have to wait for clients to have data to send on the UL to measure the client's access probability. Clients are made to periodically (e.g., periodicity between 1 ms to 160 ms) send control packets on the UL, which suffices to estimate their impact from hidden terminals (hereafter captured through client's access probability).

Figure 4:
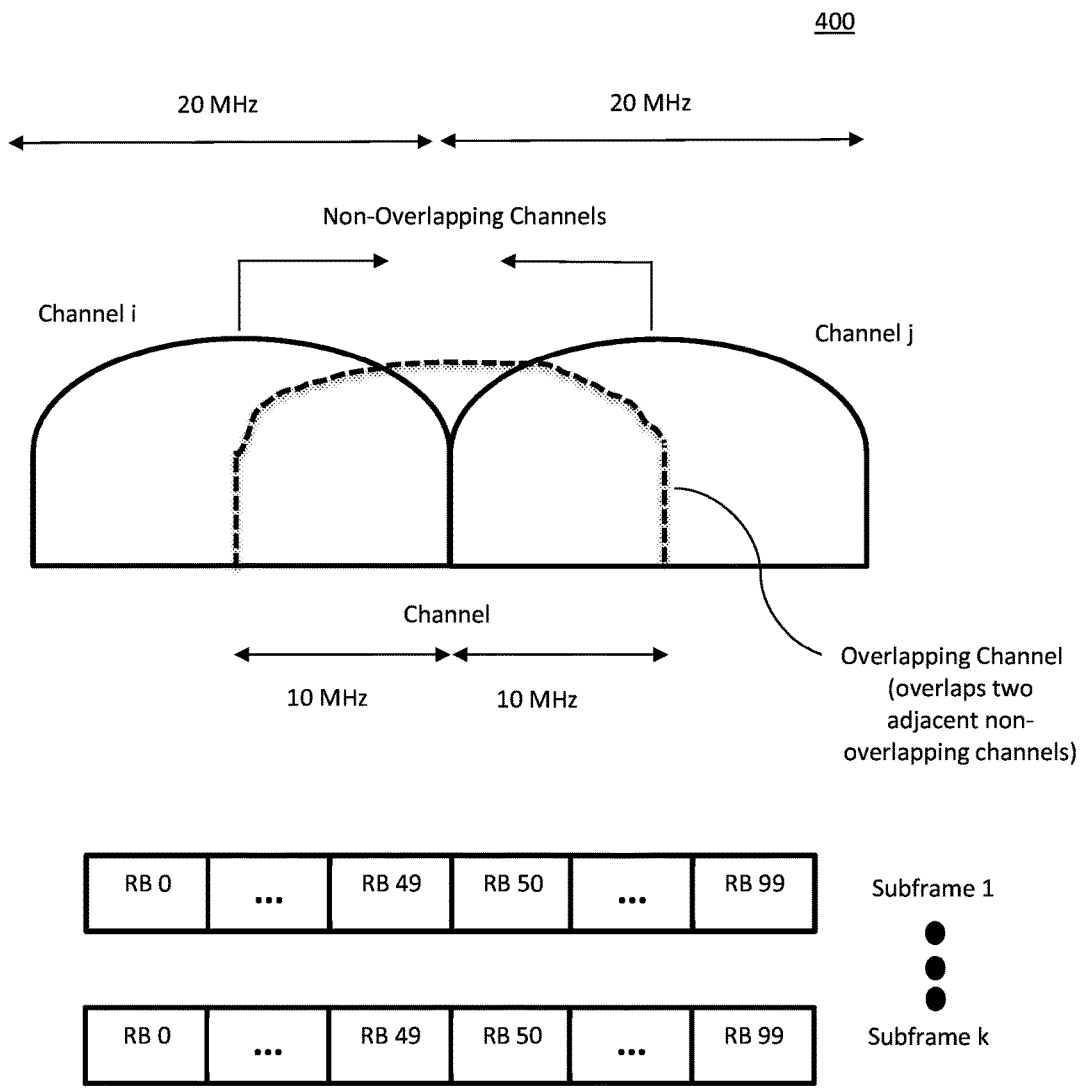
FIG. 4 is a block/flow diagram illustrating an overlapping channel and resource block distribution of the overlapping channel, in accordance with embodiments of the present invention.

Concerning scalable estimation of interference, with the above mechanism on the UL set for isolating and detecting hidden terminal interference for a client, ELI's next objective is to measure every client's channel access probability on each of the candidate unlicensed channels for operations. This can potentially constitute a prohibitive overhead that scales with both the number clients and the channels. e.g., a dense network in the 5 GHz industrial, scientific, and medical (ISM) band has 9 non-overlapping channels, and can support hundreds of clients. Therefore, ELI's mechanisms that help reduce estimation overhead along both the dimensions of channels and clients can be provided as follows:

Reducing Channel Overhead: ELI leverages the notion of overlapping channels along with flexible resource allocation orthogonal frequency-division multiple access (OFDMA) on the DL to reduce the number of channels that need to be scanned by half. A given spectrum is usually divided into multiple non-overlapping channels (e.g., 9 channels of 20 MHz each in 5 GHz) that incur low cross-channel interference and are thus used for operation. In addition to these non-overlapping channels, there are other overlapping channels (e.g., Cij, FIG. 4; 400) whose central frequencies are exactly in the middle of two adjacent non-overlapping channels (Ci,Cj, FIG. 4; 400). While ELI employs one of the non-overlapping channels during regular operations (channel access phase), ELI aims to employ these overlapping channels intelligently during the measurement phase. This allows ELI to estimate clients' access probabilities on two non-overlapping channels (e.g., Ci and Cj) simultaneously or concurrently by using a single overlapping channel (Cij), thereby reducing the net overhead by, e.g., half. Note that when the eNB uses an overlapping channel, the eNB resource blocks (e.g., 100 RBs in 20 MHz channel) are equally distributed between the two non-overlapping channels (Ci; Cj) that the eNB covers partially (e.g., 0-49 RBs span half of Ci, while 50-99 span half of Cj).

While ELI's interference detection is accurate on the UL, the client senses the 20 MHz channel (10 MHz each of the two adjacent non-overlapping channels) as a whole. This makes it difficult for the eNB to detect interference on each of the constituent channels (10 MHz blocks) just based on UL access. Hence, ELI intelligently employs joint DL and UL access, where ELI leverages the LTE's OFDMA capability on the DL to flexibly schedule a client's DL resource allocation and thus sample interference on both the constituent channels individually, while ELI employs UL access to accurately detect interference on the immediately preceding DL transmissions on each of the constituent channels. ELI's algorithm proceeds as follows.

Figure 5:
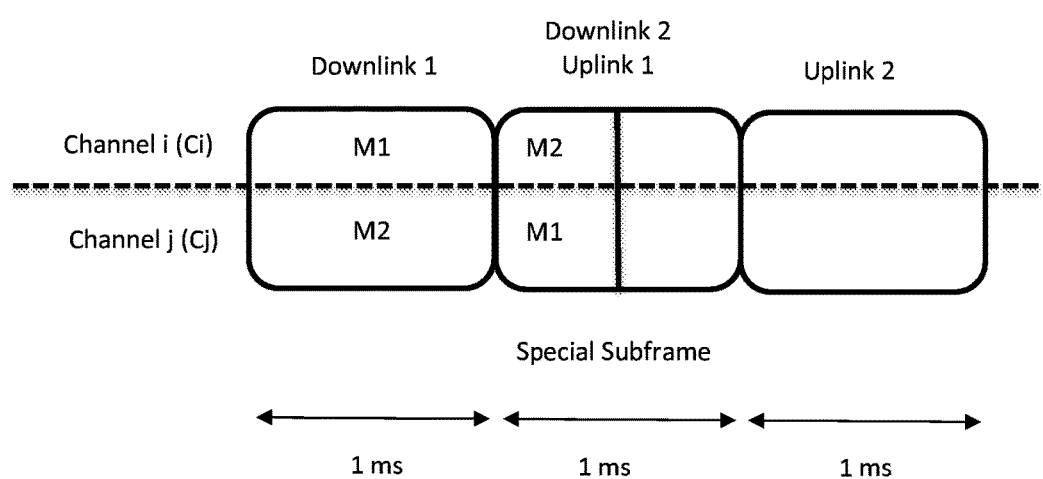
FIG. 5 is a block/flow diagram illustrating sub-frame resource allocation during interference scanning, in accordance with embodiments of the present invention.

Schedule Joint DL+UL Measurements: ELI conducts measurements in a transmit opportunity (TxOP) configuration of 3 ms each, including a DL, a special and a UL subframe in that order (FIG. 5; 500). ELI creates an alternating schedule within the DL parts of the first two (DL and special) sub-frames as follows. The eNB transmits to two sets ($M_1$;$M_2$) of $M_2$ clients each on RBs spanning parts of channel $C_i$ and $C_j$ respectively in the first (DL) sub-frame. This is followed by switching the transmissions to $M_1$ and $M_2$ on the alternate set of RBs (i.e., $C_j$ and $C_i$ respectively) in the DL part of the second (special) sub-frame (FIG. 5; 500)). In other words, eNB transmits two transport blocks $T_m(1)$ and $T_m(2)$ to each client m 2 $M_1$ on DL, where $T_m(1)$ is on RBs in $C_i$ and $T_m(2)$ is on RBs in $C_j$ (vice versa for m 2 $M_2$). The UL part of the second (special) and third (UL) sub-frames is primarily to activate UL access (detect interference through back-off) and obtain feedback from the clients in $M_1$ and $M_2$ for their DL transmissions, but can also be used to schedule data for them based on their outstanding requests. This alternating DL schedule coupled with immediate UL access allows ELI to sample (on the DL) and detect (on the UL) the interference on both $C_i$ and $C_j$ for each client in tandem.

Estimate Interference on Two Channels Simultaneously: To accurately estimate interference on each of the constituent channels Ci and Cj, ELI needs to distinguish between scenarios where there is a hidden terminal on only one or both of the constituent channels. Using ELI's prior interference estimation procedure on the UL, it is known that a missing transmission is on the UL. When this is immediately preceded by DL transmissions, the result is a "delayed" feedback (ACK/NACK) for DL transmissions. This coupled with the alternating DL schedule that samples both parts of the channel (Cij) belonging to Ci and Cj, helps ELI estimate interference accurately on Ci and Cj simultaneously for each client.

For example, when there is a delayed ACK for Tm(1) from the client, the ACK signifies a successful transmission on Ci, while the delay signifies a hidden terminal impact on UL transmission, indicating that the interference is in the other non-overlapping channel Cj.

For example, when there is a delayed NACK for Tm(1) from the client, the NACK signifies a failed transmission on Ci, while the delay signifies a hidden terminal impact on the UL transmission, indicating that there is interference in the same non-overlapping channel Ci. However, this does not preclude that there is also hidden terminal impact on Cj. To resolve this, ELI does a similar estimation on Tm(2), which then helps accurately identify if there is also simultaneous interference on Ci and Cj.

Repeat across Overlapping Channels: The eNB switches across overlapping channels and for each overlapping channel, ELI schedules multiple such 3 sub-frame TxOPs, where clients are scheduled in a round-round fashion. By gathering sufficient samples, ELI estimates their interference impact on each of the two constituent non-overlapping channels simultaneously, thereby helping reduce the overhead by half.

| Algorithm 1 Clustering clients to reduce channel-dwell time |
|---|
| 1:    Input: Access probability of all clients in all channels |
| 2:    Output: Client clusters |
| 3:    while N > 1 do       ▷ N = No. of clusters |
| 4:       for i ∈ {1,...,N} do |
| 5:          for j ∈ {1,...,N} do |
| 6:            if i ≠ j then |
| 7:               $C_i$ = centroid(i) |
| 8:               $C_j$ = centroid(j) |
| 9:               euclid = calc_euclidean($C_i$, $C_j$)) |
| 10:           end if |
| 11:         end for |
| 12:       end for |
| 13:       clusters = do_cluster(min(euclid)) |
| 14:       N = count(cluster) |
| 15:    end while |

Concerning reducing client overhead, after reducing the channel overhead, the channel-dwell time is reduced, namely the time needed to estimate interference information for each client on a given channel. In dense networks hosting a large number of clients (tens to hundred), the associated overhead can be excessive. However, such dense scenarios also offer an opportunity for ELI, where a user can expect multiple clients that are spatially co-located to share the same set of hidden terminals and thus a similar interference impact statistically. As a result, ELI aims to cluster such spatially collocated clients and measures the interference on only one representative client in each cluster, thereby reducing the channel-dwell time.

Figure 6:
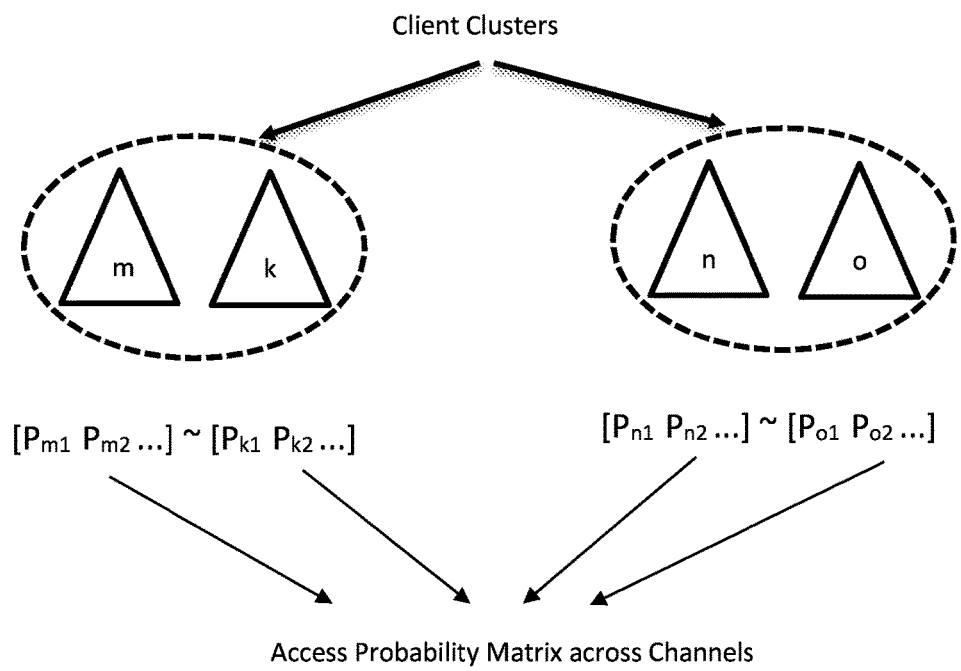
FIG. 6 is a block/flow diagram illustrating client clustering based on interference across different channels, in accordance with embodiments of the present invention.

Clustering Clients using Interference Diversity: However, the only interference information that ELI estimates is the client's access probability (Pmi) on a channel i. With this limited information, it is possible for clients (say m and n, FIG. 6; 600) in spatially distant regions around the eNB to exhibit similar interference impact (Pmi=Pni), making it a challenge to accurately identify co-located clients. ELI leverages the inherent interference diversity that exists across different channels to solve the issue. Note that the set of hidden terminals that affect a client would vary significantly from one channel to another. While the interference estimates for two distant clients can be similar on a given channel, when their interference estimates across multiple channels are jointly considered (Pm=fPm1; Pm2; . . . g), only co-located clients (e.g., clients m and k, FIG. 6; 600) would reveal a higher correlation in their interference estimate vectors (Pm). Distant clients would experience diverse interference across channels and thus automatically reveal lower correlation. As a result, by clustering the clients using their interference estimates across the frequency domain (channels), ELI is able to co-locate clients with high accuracy, where using data from more channels contributes to increasing accuracy.

Clustering technique: To cluster the clients, ELI uses one of the standard clustering techniques called hierarchical clustering. The hierarchical clustering measures the similarity between two vectors (access probabilities in each channel, of two clients—Pm, FIG. 6, 600) using the Euclidean distance between them. The clustering algorithm uses an agglomerative (bottom up) approach where each client starts as a single element in its own cluster and in each subsequent iteration two clusters that have the smallest Euclidean distance between their respective centroids (calculated as the average access probability of the cluster) are merged together until all the clusters merge together to form one cluster. The advantage of employing hierarchical clustering as opposed to other popular clustering techniques like K-means is that the hierarchical clustering outputs a hierarchy, a structure that is more informative than the unstructured set of clusters returned by other flat clustering techniques. This allows the exemplary methods to further fine-tune the clustering threshold (similarity threshold), and thereby the overhead incurred. The pseudo-code of the clustering process is shown in algorithm 1 above.

Benefits of ELI's Overhead Reduction: To highlight the potential benefits of ELI's channel scanning mechanisms, consider an instance of an eNB supporting 50 clients with 9 candidate channels, in 5 GHz band. If 50 subframes are employed (1 subframe=1 ms, each sub-frame supporting max. 10 clients) per client to estimate its access probability, then the total scan time for 9 channels without ELI's optimizations would incur a total estimation overhead of ≈2.3 secs (4% of a 1 min epoch). With ELI's channel reduction, this overhead reduces to ≈1.2 secs (2% of epoch) and with client clustering, it further reduces to only 300 ms (only 0.5% of epoch).

ELI's schemes are now described to suitably incorporate the interference statistics to enhance LTE's performance at both macro time scale through dynamic channel selection, as well as micro time scales through interference-aware access scheduling.

Dynamic channel selection: At macro time scales, ELI switches eNB operating channel to the channel that offers minimal interference (as measured during the estimation phase) as well as a higher average transmission rate to the clients. The concept of dynamic channel switching is practiced in WiFi APs where the AP switches its operating channel periodically to move into a better channel. The advantage that the WiFi AP has over the LTE eNB while selecting the channel is that the WiFi AP does not necessarily have to take into account the interference at the clients' end. Even a sub-optimal channel selection by a WiFi AP may not have a big impact on its performance, because of the WiFi's distributed channel access mechanism (clients access channel independently) and its inherent interference-mitigation techniques (e.g., RTS/CTS mechanism). However, when it comes to LTE, the eNB must take into account the interference in every channel in addition to the client rates before picking the best channel. ELI periodically employs the access probability statistics gathered from all the available channels (C) to select the best channel (Cb 2 C), as shown below:

$$C_b = \arg\max_{i \in C} \left\{ \sum_{m=1}^{M} P_{mi} \cdot \log(R_{mi}) \right\}$$

where Rmi represents the average channel rate of the client m in channel i, calculated during the measurement phase, and incorporates both the DL and UL average rates as Rmi=βRmi D+(1−β)Rmi U, where β2 (0, 1) captures the relative importance/load between DL and UL traffic. It is noted that the dynamic channel selection aims to improve performance on a macro time scale. Consequently, ELI is aimed at static clients and for clients whose mobility changes over a coarse time scale. For more dynamic mobile clients, ELI performs intelligent access scheduling on a micro time scales, as discussed below.

Interference-aware PF (IPF) scheduler: To improve LTE's performance at micro time scale (order of milliseconds), ELI transforms the LTE's native interference-agnostic PF scheduler into an interference-aware PF scheduler (IPF). While IPF can be applied to both DL and UL, the method focuses on the DL, starting with background on native LTE schedulers.

Regarding the native PF scheduler, among the many LTE schedulers that exist, the most extensively used is the PF scheduler because of the right balance the PF scheduler achieves between both performance (throughput) and fairness across all the clients. For the PF scheduler, the optimal scheduling is obtained by maximizing the logarithmic utility function—Pm log(Rm), where Rm is the average channel rate of the client m, calculated over time. Consequently, the PF scheduler prioritizes clients whose instantaneous channel rate (measured at the eNB based on the modulation and coding scheme used) is the highest when normalized to its own average channel rate. Thus, the decision (S(t)) of allocating B resource blocks to N clients at each sub-frame (t), is formalized as shown below.

$$S(t) = \operatorname*{argmax}_{x \in S} \left\{ \sum_{b=1}^{B} \sum_{m=1}^{N} \frac{x_{m,b} T_{m,b}(t)}{R_m(t)} \right\}, \text{ s.t. } \sum_{i=1}^{N} x_{m,b} \leq 1, \forall b$$

Where, x is a binary variable capturing the schedule.

The rm,b is the instantaneous rate of client m on resource block b in a single input/single output (SISO) system.

Subsequent to each assignment, the average channel rate of a client m, is then updated as:

$$R_i(t) = \begin{cases} \frac{1}{\alpha} \sum_{b=1}^{B} r_{m,b}(t) + \left(1 - \frac{1}{\alpha}\right) R_m(t-1), & \text{if } x_{m,b} == 1 \\ \left(1 - \frac{1}{\alpha}\right) \cdot R_m(t-1), & \text{otherwise} \end{cases}$$

where, α is an exponential weighted constant.

IPF scheduler: One of the pitfalls of the native PF scheduler is that the PF scheduler allocates resources to clients purely based on their channel rates, which works for the licensed spectrum. However, the instantaneous channel rates are not reflective of the true channel state of the client in the unlicensed spectrum, which is also impacted by hidden terminal interference. Further, such interference also varies from one client to another based on its spatial location. ELI leverages such interference diversity that exists within a cell to convert the native (PF) scheduler into a weighted interference-aware PF scheduler. The latter not only uses channel diversity, but also incorporates interference diversity and its impact to capture the true channel state of the clients. If Pm represents the moving average probability of the client m utilizing its resources (access probability, subject to the HT interference), then the interference-aware PF scheduler (IPF scheduler) is given by:

$$S(t) = \underset{x \in S}{\operatorname{argmax}} \left\{ \sum_{b=1}^{B} \sum_{m=1}^{N} \frac{P_m \cdot x_{m,b} T_{m,b}(t)}{R_m(t)} \right\}, \text{ s.t. } \sum_{i=1}^{N} x_{m,b} \leq 1, \forall b$$

ELI uses the IPF scheduler to schedule clients within the channel, thereby adapting ELI's resource schedule to account for the impact of interference in clients' channel rate. It is noted that the moving average of clients' channel access probability is calculated over few tens of sub-frames. Since each sub-frame lasts for only 1 ms, the time granularity used to calculate the access probability (and adapt resource scheduling accordingly) is finer compared to the time granularity of the actual mobility of a client. This allows the IPF scheduler to serve for both mobile and static clients.

Figure 7:
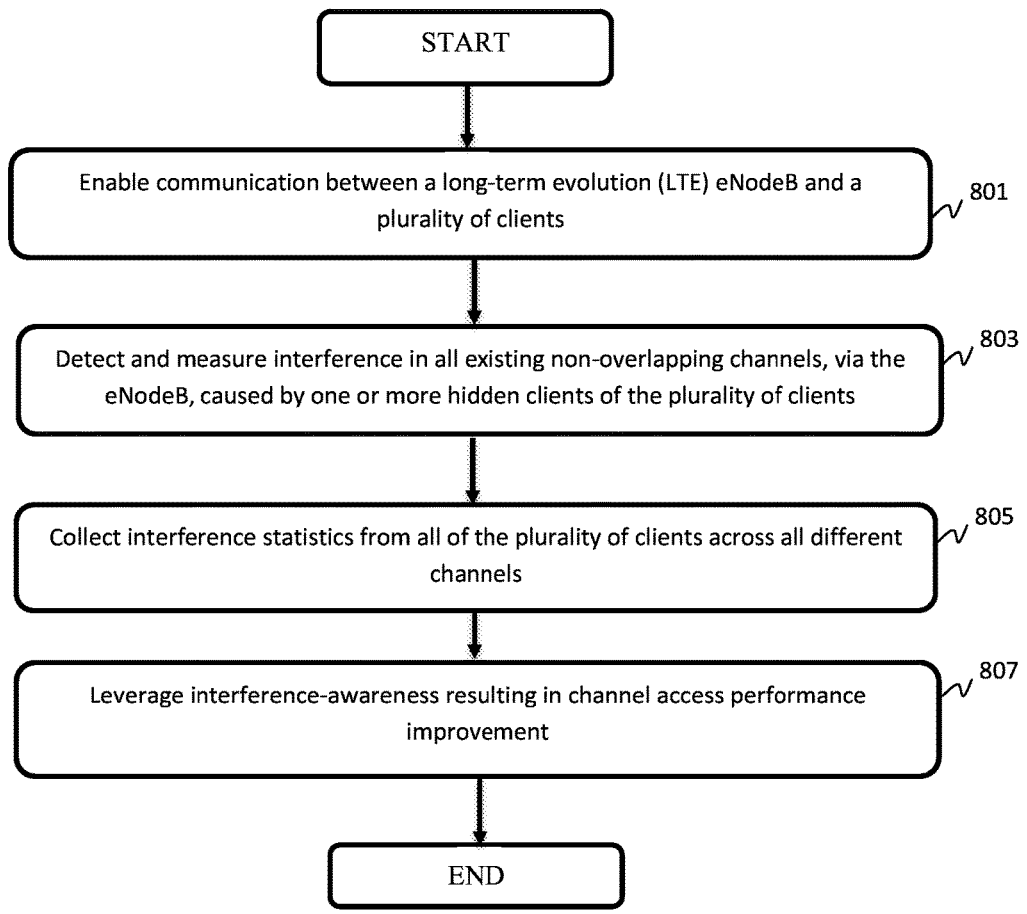
FIG. 7 is block/flow diagram of an exemplary method for measuring interference at clients, in accordance with embodiments of the present invention.

FIG. 7 is block/flow diagram illustrating a method for achieving a smooth PV output profile, in accordance with embodiments of the present invention.

At block 801, enable communication between a long-term evolution (LTE) eNodeB and a plurality of clients.

At block 803, detect and measure interference in all existing non-overlapping channels, via the eNodeB, caused by one or more hidden clients of the plurality of clients.

At block 805, collect interference statistics from all of the plurality of clients across all different channels.

At block 807, leverage interference-awareness resulting in channel access performance improvement.

Figure 8:
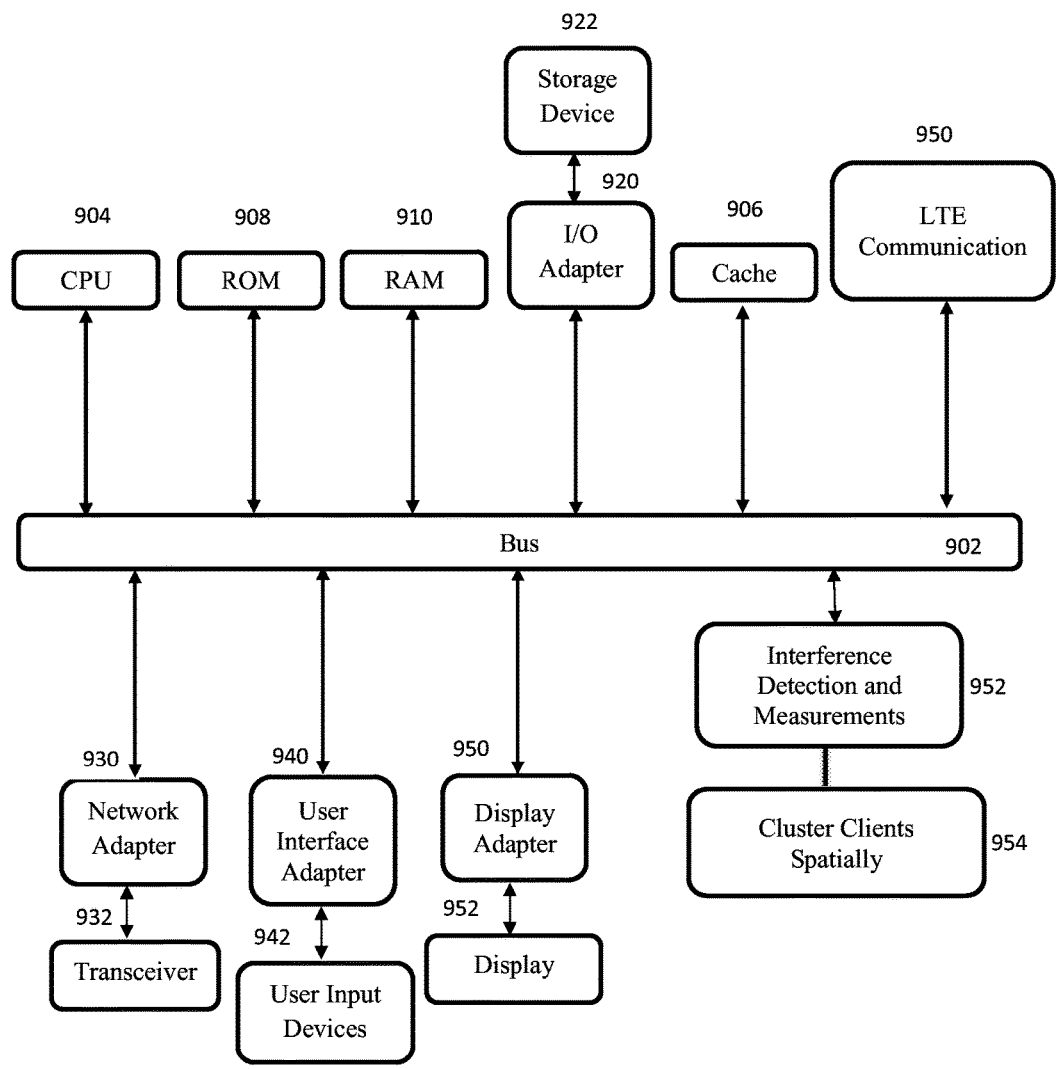
FIG. 8 is a block/flow diagram of an exemplary LTE processing system, in accordance with embodiments of the present invention.

FIG. 8 is a block/flow diagram of an exemplary processing system, in accordance with embodiments of the present invention.

The processing system includes at least one processor (CPU) 904 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a power management system 950 is operatively coupled to the system bus 902. An LTE communication network 950 can be connected to the bus 902. This enables interference detection and measurements 952 by clustering clients spatially 954.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
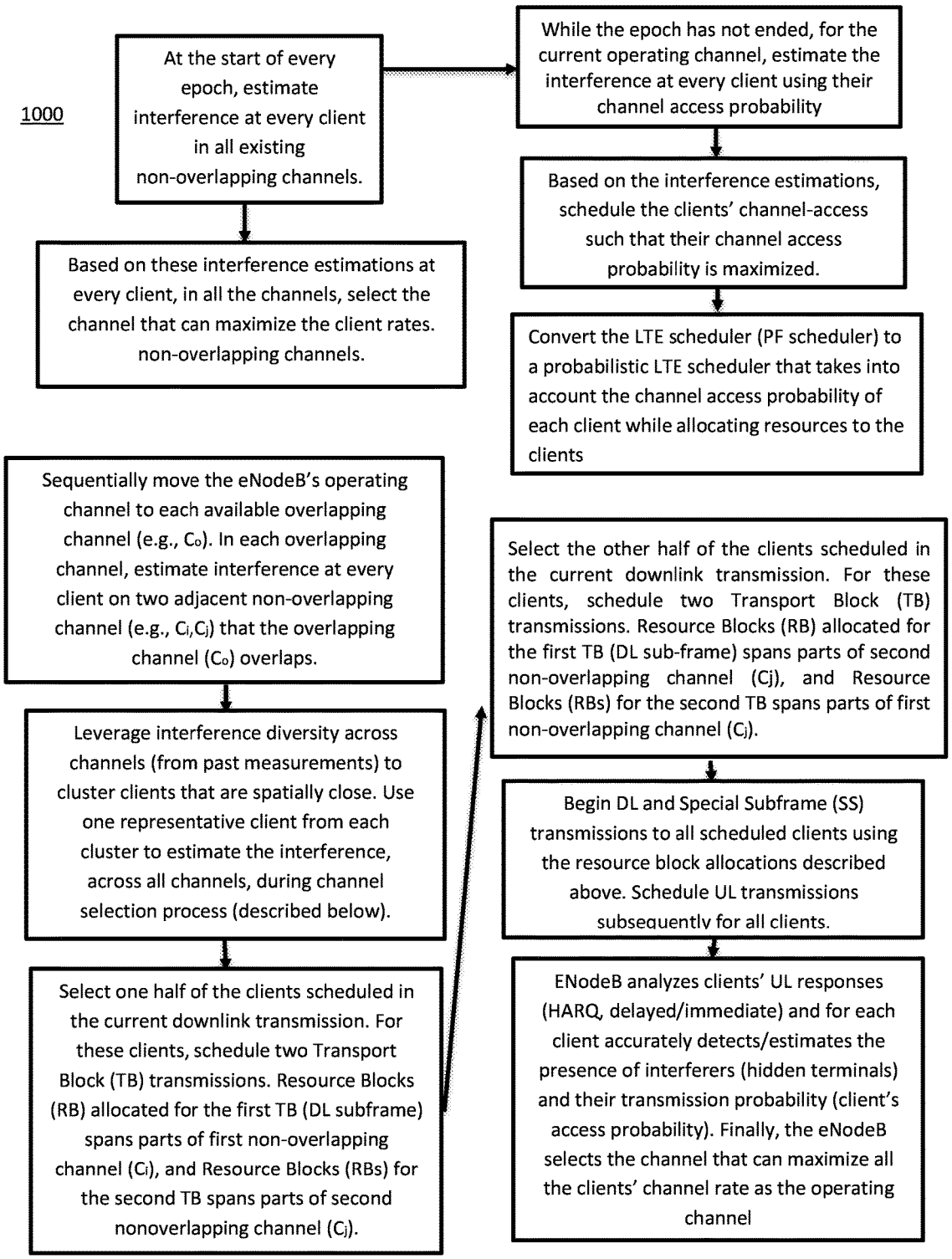
FIG. 9 is block/flow diagram of an exemplary method for estimating interference at every client in all existing non-overlapping channels, in accordance with embodiments of the present invention.

FIG. 9 is block/flow diagram 1000 of an exemplary method for estimating interference at every client in all existing non-overlapping channels, in accordance with embodiments of the present invention.

The exemplary embodiments employ an epoch-based approach where at a macro-time-scale (the start of every epoch), the eNodeB selects an operating channel that can maximize the clients' channel rate, and once the channel is selected, at a micro-time-scale (while the epoch has not ended), the eNodeB estimates the interference at every client and appropriately allocates the resource blocks for the DL/UL transfers.

Devices operating in the unlicensed spectrum employ one of the multiple non-overlapping channels available. However, in addition to these non-overlapping channels, there are overlapping channels (whose bandwidth spans two adjacent non-overlapping channels) that devices generally avoid to minimize cross-channel interference. The exemplary embodiments employ these overlapping channels to estimate interference. The exemplary methods move the eNodeB sequentially into these overlapping channels and estimate interference on both the adjacent non-overlapping channels simultaneously or concurrently.

Instead of measuring interference at each and every client, the exemplary embodiments cluster clients spatially (clients affected by same set of hidden terminals) and select one representative client in each cluster to measure the interference during a channel selection process. To cluster the clients, the exemplary embodiments employ the interference similarities measured across channels in the past. Interference diversity across channels ensures minimizing the false-positive/false-negatives.

The resource blocks in the overlapping channel span two adjacent non-overlapping channels that the overlapping channel shares its bandwidth with. The exemplary methods aim to measure interference on the two adjacent non-overlapping in a TxOP configuration of 3 ms each, consisting of a DL, a special and a UL sub-frame in that order. The exemplary methods create an alternating schedule within the DL parts of the first two (DL and special) sub-frames, such that the RBs used for the first TB (DL subframe) spans parts of first non-overlapping channel (Ci), and Resource Blocks (RBs) for the second TB spans parts of second non-overlapping channel (Cj). For the other half of the scheduled clients, the RB allocation of DL and special subframes are reversed.

After the downlink transmissions, the UL transmissions of each client are analyzed. Using the conditions below, presence of interferers and their probability of transmissions in each of the adjacent non-overlapping channel (Ci and Cj) are noticed.

If a client responds with an ACK for TB using RB of Ci, the eNodeB concludes that there is no interference at that client in channel Ci and Cj.

If a client responds with a delayed ACK for the TB using RBs on Ci, the eNodeB concludes that there is no interference on Ci (successful DL transmission), but interference on channel Cj (delayed ACK transmission), at that client.

If the client responds with a delayed NACK for TB using RBs that span Ci, the eNodeB concludes that there is interference on Ci. Also, eNodeB checks the client's response for the TB using RBs that span Cj. If it is an ACK, then it concludes no interference on Cj. If it is a NACK, it concludes interference both on Ci and Cj.

Interference at clients is captured using the probability of clients successfully using their allocated RBs for UL transmissions (probability of clients backing-off from transmissions due to interference). To reliably measure if the clients' used their allocated RBs, the proposal eNodeB use the clients' pilot tones sent at lowest modulation.

The methods then converts the naïve LTE resource scheduler into a probabilistic (interference-aware) LTE resource scheduler that takes into account the probability that the client will use the allocated RBs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for employing an epoch-based approach to estimating interference in an unlicensed spectrum, the method comprising:
    enabling communication between a long-term evolution (LTE) evolved node B (eNodeB) and a plurality of clients;
    detecting and measuring the interference in all existing channels, via the LTE eNodeB, caused by one or more hidden clients of the plurality of clients;
    collecting interference statistics from all of the plurality of clients across all different channels; and
    leveraging interference-awareness resulting in channel access performance improvement at a macro-time scale and a micro-time scale.

2. The method of claim 1, further comprising spatially clustering one or more of the plurality of clients.

3. The method of claim 2, further comprising selecting, in each cluster, one representative client from the one or more of the plurality of clients spatially clustered, to measure the interference during a channel selection process.

4. The method of claim 3, further comprising estimating client access probabilities on two adjacent non-overlapping channels concurrently by employing a single overlapping channel.

5. The method of claim 4, further comprising employing joint downlink (DL) and uplink (UL) access to access the interference on both constituent channels individually.

6. The method of claim 5, further comprising allocating resource blocks for DL transfers and UL transfers.

7. The method of claim 1, further comprising converting an LTE scheduler to a probabilistic LTE scheduler by taking into account a channel access probability of each client of the plurality of clients while allocating resources to each of the plurality of clients.

8. A system for employing an epoch-based approach to estimating interference in an unlicensed spectrum, the system comprising:
    a memory; and
    a processor in communication with the memory, wherein the processor runs program code to:
        enable communication between a long-term evolution (LTE) evolved node B (eNodeB) and a plurality of clients;
        detect and measure the interference in all existing non-overlapping channels, via the LTE eNodeB, caused by one or more hidden clients of the plurality of clients;
        collect interference statistics from all of the plurality of clients across all different channels; and
        leverage interference-awareness resulting in channel access performance improvement at a macro-time scale and a micro-time scale.

9. The system of claim 8, wherein one or more of the plurality of clients are spatially clustered.

10. The system of claim 9, wherein, in each cluster, one representative client from the one or more of the plurality of clients spatially clustered is selected to measure the interference during a channel selection process.

11. The system of claim 10, wherein client access probabilities are estimated on two non-overlapping channels concurrently by employing a single overlapping channel.

12. The system of claim 11, wherein joint downlink (DL) and uplink (UL) access is employed to access the interference on both constituent channels individually.

13. The system of claim 12, wherein resource blocks are allocated for DL transfers and UL transfers.

14. The system of claim 8, wherein an LTE scheduler is converted to a probabilistic LTE scheduler by taking into account a channel access probability of each client of the plurality of clients while allocating resources to each of the plurality of clients.

15. A non-transitory computer-readable storage medium comprising a computer-readable program for employing an epoch-based approach to estimating interference in an unlicensed spectrum, wherein the computer-readable program when executed on a computer causes the computer to perform the steps of:
    enabling communication between a long-term evolution (LTE) evolved node B (eNodeB) and a plurality of clients;
    detecting and measuring the interference in all existing non-overlapping channels, via the LTE eNodeB, caused by one or more hidden clients of the plurality of clients;
    collecting interference statistics from all of the plurality of clients across all different channels; and
    leveraging interference-awareness resulting in channel access performance improvement at a macro-time scale and a micro-time scale.

16. The non-transitory computer-readable storage medium of claim 15, wherein one or more of the plurality of clients are spatially clustered.

17. The non-transitory computer-readable storage medium of claim 16, wherein, in each cluster, one representative client from the one or more of the plurality of clients spatially clustered is selected to measure the interference during a channel selection process.

18. The non-transitory computer-readable storage medium of claim 17, wherein client access probabilities are estimated on two non-overlapping channels concurrently by employing a single overlapping channel.

19. The non-transitory computer-readable storage medium of claim 18, wherein joint downlink (DL) and uplink (UL) access is employed to access the interference on both constituent channels individually.

20. The non-transitory computer-readable storage medium of claim 19, wherein resource blocks are allocated for DL transfers and UL transfers.

* * * * *